United States Patent
Tokioka et al.

[11] Patent Number: 5,990,720
[45] Date of Patent: *Nov. 23, 1999

[54] TEMPERATURE PHASE SHIFT CIRCUIT AND COORDINATE INPUT APPARATUS

[75] Inventors: Masaki Tokioka, Fujisawa; Atsushi Tanaka, Kawasaki; Yuichiro Yoshimura, Kamakura; Ryozo Yanagisawa, Chiba-ken; Katsuyuki Kobayashi; Hajime Sato, both of Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/366,918

[22] Filed: Dec. 30, 1994

[30] Foreign Application Priority Data

Jan. 12, 1994 [JP] Japan .................................. 6-001555

[51] Int. Cl.$^6$ ...................................................... H03H 11/16
[52] U.S. Cl. ............................................ 327/253; 327/513
[58] Field of Search ...................... 178/18, 19; 345/177;
367/907; 341/5, 24, 115; 327/231, 232,
234, 236, 237, 239, 244, 245, 246, 247,
252, 258, 259, 362, 512, 513, 253; 331/176

[56] References Cited

U.S. PATENT DOCUMENTS

| | | | |
|---|---|---|---|
| 3,947,751 | 3/1976 | Bray | 323/311 |
| 3,997,818 | 12/1976 | Bodkin | 361/100 |
| 4,414,837 | 11/1983 | Bice et al. | 73/1 B |
| 4,472,669 | 9/1984 | Denham et al. | 341/115 |
| 5,253,187 | 10/1993 | Kaneko et al. | 178/19 |
| 5,491,305 | 2/1996 | Kawakami et al. | 178/19 |
| 5,537,049 | 7/1996 | Oita et al. | 327/513 |
| 5,539,160 | 7/1996 | Tokioka et al. | 345/177 |

FOREIGN PATENT DOCUMENTS

| | | |
|---|---|---|
| 0333219 | 9/1989 | European Pat. Off. . |
| 60-186111 | 9/1985 | Japan ............................. 327/252 |
| 3185319 | 8/1991 | Japan . |
| 5080920 | 4/1993 | Japan . |

OTHER PUBLICATIONS

A Temperature–Compensated Bridge Circuit, by Masaru Matsuno, et al., published May 18, 1993, pp. 737–740.
IBM Technical Disclosure Bulletin, vol. 13, No. 1, Jun. 1970.

*Primary Examiner*—Kenneth B. Wells
*Attorney, Agent, or Firm*—Fitzpatrick Cella Harper & Scinto

[57] ABSTRACT

An object of the invention is to provide a coordinate input apparatus which phase-shifts an input signal in accordance with temperature and corrects a phase shift due to a change in temperature, thereby performing coordinate input. A phase shift unit of a temperature phase shift circuit is constituted by connecting two thermistors having the same temperature characteristics and two capacitors having the same capacitance to constitute a bridge circuit. An output (Eout) has a gain of 1 with respect to an input (Ein) and is phase-shifted by $\tan^{-1}[(-2\omega CR)/\pm(1-\omega CR)^2)]$, where R represents a value which exponentially varies in accordance with temperature. For this reason, the output signal can be phase-shifted in accordance with a change in temperature. When this circuit is applied to a coordinate input apparatus using an ultrasonic wave vibration, the phase shift of a vibration due to variations in temperature is corrected, thereby enabling coordinate input stable with respect to changes in temperature.

16 Claims, 14 Drawing Sheets

$$\frac{E_{out}}{E_{in}} = \frac{(\omega CR)^2 + 1}{(\omega CR)^2 + 1} = 1$$

$$\theta = \tan^{-1} \frac{-2\omega CR}{\pm(1-(\omega CR)^2)}$$

$$\theta : 0° \sim \pm 180°$$

$$\omega = 2\pi f$$

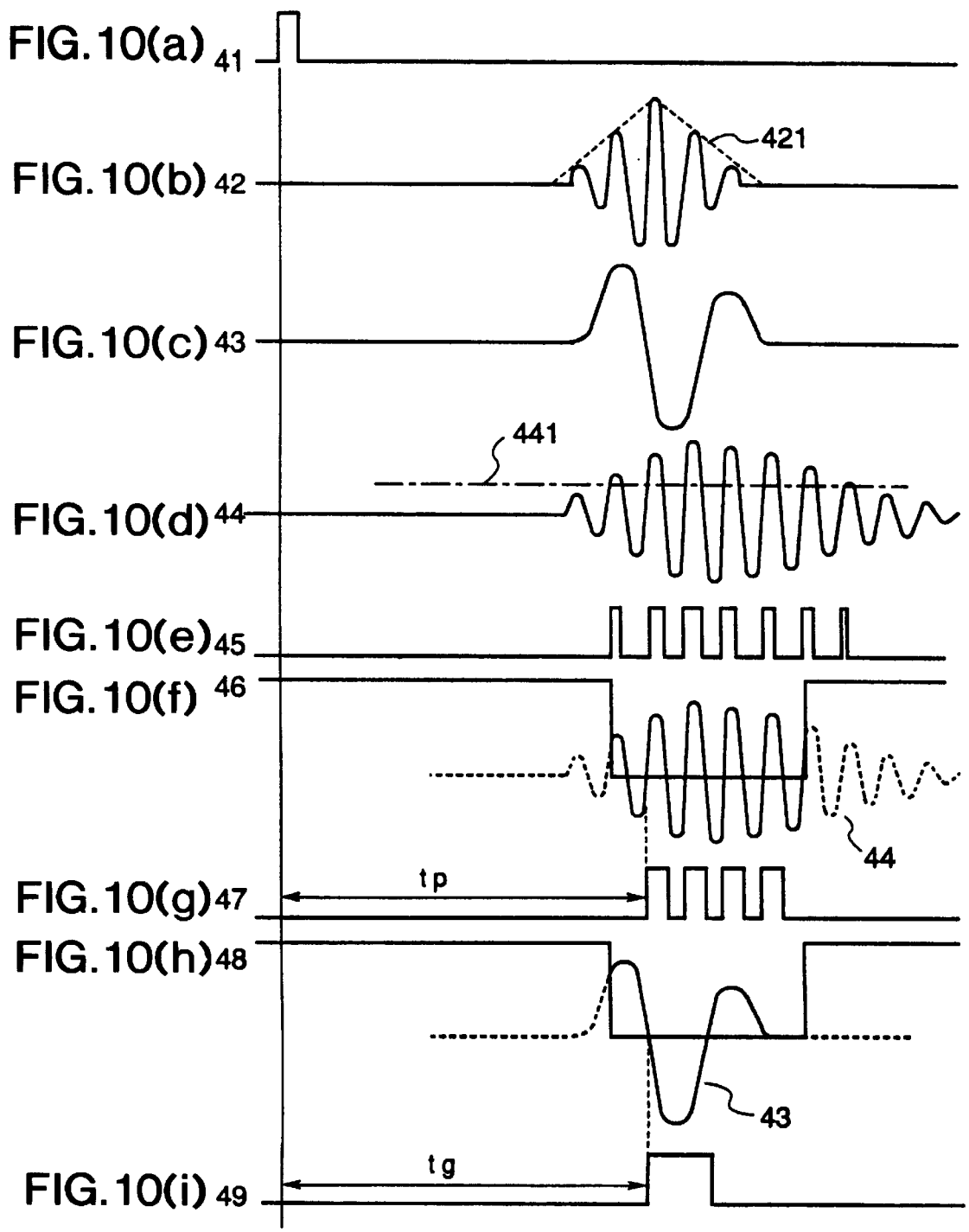

TEMPERATURE PHASE SHIFT CIRCUIT AND COORDINATE INPUT APPARATUS

BACKGROUND OF THE INVENTION

1. Field of the Invention

The present invention relates to a temperature phase shift circuit for performing temperature compensation of the phase of a signal or time data in, e.g., an environment with a change in temperature, and an ultrasonic wave coordinate input apparatus using this circuit.

2. Related Background Art

Normally, countermeasures against temperature changes in various electronic equipments which are susceptible to influences of such temperature changes are classified as follows.

(1) When a change in characteristics of an electronic device such as a sensor upon a change in temperature. poses a problem, the temperature is measured, and the obtained data is corrected in accordance with the measured temperature. Particularly, when a high precision is required, a temperature control mechanism is arranged to keep the temperature of the electronic device at a predetermined value.

(2) When a change in characteristics of an electronic circuit, mainly a semiconductor element upon a change in temperature poses a problem, as a first method, a feedback loop is formed in a circuit to perform feedback control, thereby obtaining a predetermined output amplitude. As a second method, reverse characteristics, with respect to temperature, of a temperature compensation passive element (represented by a temperature compensation ceramic capacitor) are utilized to cancel the change in characteristics of the semiconductor element upon the temperature change. The former method is normally used to stabilize the gain of an amplifier or the oscillation frequency of an oscillator. The latter method is generally used when the same purpose as that of the former needs to be attained though the precision need not be so high.

As an apparatus influenced by a change in temperature, an ultrasonic wave coordinate input apparatus will be described below. FIG. 2 is a block diagram schematically showing the arrangement of an ultrasonic wave coordinate input apparatus.

In FIG. 2, an arithmetic operation/control circuit 1 controls the entire apparatus and at the same time calculates a coordinate position. A vibration member driving circuit 2 drives a vibration member 4 in a vibration pen 3. A pulsed driving signal is supplied from the operation/control circuit 1 to the vibration member driving circuit 2. The driving signal is amplified by the vibration member driving circuit 2 with a predetermined gain and then applied to the vibration member 4. The electrical driving signal is converted into a mechanical vibration by the vibration member 4 and transmitted to a vibration transmission plate 8 via a pen tip 5. The vibration transmission plate 8 is constituted by a transparent member such as an acrylic or glass plate. An input operation by the vibration pen 3 is performed by touching the surface of the vibration transmission plate 8 with it.

That is, when the vibration pen 3 is brought into contact with an area (effective area) A indicated by a solid line in FIG. 2, a vibration generated by the vibration pen 3 is input to the vibration transmission plate 8, and the input vibration is detected by vibration sensors 6a to 6d. The detected vibration is converted into an electrical signal by the vibration sensors 6a to 6d, and its waveform is processed by a signal waveform detection circuit 9, thereby extracting the arrival timings of the vibration to the vibration sensors 6a to 6d. A predetermined time offset amount is subtracted from the time lengths from the driving timing of the drive signal to obtain the arrival timings of the vibration. The obtained values are used as vibration propagation times that were required by the vibration to propagate on the vibration transmission plate 8, thereby performing arithmetical processing. With this operation, the distances between the point designated by the vibration pen 3 to the vibration sensors 6a to 6d are calculated. A coordinate position can be calculated from a plurality of obtained pen-to-sensor distances by using triangulation.

The predetermined time offset amount is the sum of a time serving as the same offset amount for all the vibration sensors 6a to 6d, e.g., a time necessary for propagation of the vibration at the pen tip 5 of the vibration pen 3, and a time serving as an offset amount which is different for each of the vibration sensors 6a to 6d, e.g., a circuit delay generated in the signal waveform detection circuit 9 or the response time of each of the vibration sensors 6a to 6d. This time is present independently of the actual vibration propagation time.

The propagating vibration is reflected by the end face of the vibration transmission plate 8. To prevent (or decrease) the reflected wave from returning to the central portion, an anti-vibration member 7 is provided to the side surface portion of the vibration transmission plate 8. The operation/control circuit 1 performs coordinate calculation processing by the vibration transmission timings extracted by the signal waveform detection circuit 9, and at the same time, outputs coordinate data to a display driving circuit 10, thereby displaying the data on a display 11 such as a liquid crystal display unit. The display 11 is arranged behind the vibration transmission plate 8 and displays dots at positions traced by the vibration pen 3. These dots can be observed through the vibration transmission plate 8 (transparent member).

If the ambient temperature around the apparatus changes, the time length from the driving timing to the arrival timing changes accordingly. For this reason, a coordinate portion may be erroneously calculated and output. The main factors contributing to this problem are as follows.

a) In accordance with a change in temperature of the vibration pen 3, the propagation time of the vibration in the pen tip 5 changes to cause a change in time corresponding to the predetermined time offset amount. The pen tip 5 consists of a polyamide-imide plastic enhance the operability, i.e., feeling of writing by the vibration pen 3. In this case, the sound velocity in the material largely changes with respect to a change in temperature.

b) In accordance with a change in temperature of the vibration pen 3, the frequency of the vibration generated in the vibration pen 3 changes. Since the vibration propagating in the vibration transmission plate 8 is Lamb wave, the propagation speed changes in accordance with frequency. For this reason, the vibration propagation time itself changes.

c) In accordance with a change in temperature of the signal waveform detection circuit 9, the amount of time delay due to the circuit also changes. This is because the circuit has characteristics in which the switching speed of the semiconductor element in the circuit largely changes in accordance with temperature. When a semiconductor element having a switching speed at least 100 times that corresponding to the vibration frequency is selected in advance, a change in temperature of performance can be suppressed. However, this cannot be realized from the viewpoint of cost.

In addition to the above three factors, a change in propagation speed due to a change in temperature of the vibration transmission plate 8 (even at the same vibration frequency), or a change in response characteristics of the sensor is also a potential factor, though the influence of such factors is extremely small as compared to the above three factors.

A change in arrival timing due to the above three factors results in a change in the same direction, i.e., when the temperature increases, the arrival timing is delayed, and when the temperature decreases, the arrival timing is advanced. If the vibration generated by the vibration pen 3 has a frequency of about 500 kHz, the arrival timing changes by about 450 ns within a temperature range of 0 to 40° C. If the distance between the vibration pen 3 and the vibration sensor 6 does not change, the arrival timing linearly increases with respect to temperature. The value, 450 ns corresponds to about ¼ the period of the vibration and is too large to ignore. In this case, the value, 450 ns, is exemplified. However, this value changes when the vibration frequency or shape of the pen is changed in accordance with the use purpose of the apparatus. The value, 450 ns, is therefore only an exemplary value.

Of the factors a) to c), the factor a), i.e., a change in vibration propagation time in the pen tip 5 is considered as the largest factor influencing the coordinate calculation, and accounts for ½ or more of the value, 450 ns. Originally, since a plastic has a sound velocity smaller than that of a metal, the absolute amount of a change in propagation time due to a change in temperature increases even when the propagation length does not change. Therefore, although the length of the pen tip 5 is currently minimized, the above difference in propagation time is still generated.

The following methods are used to eliminate the difference in propagation time.

α) Even when the ambient temperature changes, the predetermined time offset amount is updated to a new value by designating a known input point, thereby correcting the delay time.

β) Vibration sensors which number more than that necessary for coordinate calculation by at least one are arranged, and a change in time offset amount, which is included in the arrival timings of all the vibration sensors by the same amount, is obtained, thereby performing distance and coordinate calculations.

These methods are used as countermeasures against temperature changes, thereby preventing variations of the function of the apparatus itself depending on the variation amount of the physical characteristics of the vibration pen 3 (electroacoustic conversion element).

However, the above-described conventional countermeasures, applied to an electronic apparatus which is liable to the influence of the environmental temperature, have the following drawbacks.

1) In order to compensate the characteristics of an electronic device such as a sensor, a large-scaled operation control system for measuring the temperature by a temperature sensor or the like and performing correction, or a large-scaled temperature control system for keeping a predetermined temperature is required. In any case, the apparatus itself becomes bulky and expensive.

2) The conventional temperature compensation circuit is used to keep a predetermined circuit gain or oscillation frequency or to linearly change them with respect to temperature. Therefore, this temperature compensation circuit cannot compensate the phase or detection timing of a signal.

In addition, the temperature compensation ceramic capacitor to be used has a performance range of ±5% even if it is of a high-precision type. For this reason, a compensation circuit constituted by a capacitor prior to selection, i.e., at a low cost becomes a factor for variations in characteristics. Since the temperature coefficient is not very large, several hundred ppm/°C at maximum, the performance range for temperature compensation is accordingly limited.

Furthermore, the conventional ultrasonic wave coordinate input apparatus has the following drawbacks.

1) In the arrangement α), the user of the apparatus must often designate a known input point, resulting in a complex operation. Additionally, since a known input point is designated by the user, the coordinate calculation precision is degraded.

2) In the arrangement β), at least one more sensor is necessary, resulting in an increase in cost. Additionally, the arrival timing used for calculation of the variation amount of the time offset includes an error such as circuit noise. For this reason, a calculation error is generated in the obtained variation amount of the time offset as well, resulting in a degradation in coordinate calculation precision as in the arrangement α).

SUMMARY OF THE INVENTION

The present invention has been made in consideration of the problems with the above prior art, and has as its object to provide a temperature phase shift circuit which corrects a phase shift due to a change in temperature with a simple arrangement, and a coordinate input apparatus capable of performing coordinate input stable with respect to a change in temperature.

It is another object of the present invention to provide a temperature phase shift circuit for outputting an output signal phase-shifted from an input signal in accordance with an ambient temperature, wherein temperature-sensing resistive portions, a resistance of each of which changes with respect to a change in temperature and capacitors are alternately connected to constitute a bridge circuit.

It is still another object of the present invention to provide a coordinate input apparatus using an input point of a vibration input to a vibration transmission member as an input coordinate position, comprising:

vibration generation means for generating the vibration;

detection means for detecting the vibration generated by the vibration generation means and input to the vibration transmission member and transmitted;

generation means for generating a signal on the basis of the vibration detected by the detection means;

phase shift means for phase-shifting the signal generated by the generation means in accordance with a temperature;

measurement means for measuring a period of time, until the vibration generated by the vibration generation means is detected by the detection means, on the basis of the signal phase-shifted by the phase shift means; and coordinate calculation means for calculating coordinates of a position, where the vibration is input to the vibration transmission member by the vibration generation means, on the basis of the time measured by the measurement means.

It is still another object of the present invention to provide a temperature phase shift circuit wherein, when a signal is input to the temperature phase shift circuit constituted by alternately connecting temperature-sensing resistive portions and capacitors to constitute a bridge circuit, a signal phase-shifted in accordance with a change in temperature is output while the amplitude is kept unchanged.

It is still another object of the present invention to provide a coordinate input apparatus wherein a signal generated from an input vibration is phase-shifted in accordance with a change in temperature, and the coordinate position of an input point is detected on the basis of the signal, thereby preventing an error in the coordinate position due to the phase shift of the signal due to the change in temperature.

BRIEF DESCRIPTION OF THE DRAWINGS

FIGS. 10(a)–10(i) are respective timing charts of waveforms in signal processing;

DETAILED DESCRIPTION OF THE PREFERRED EMBODIMENTS (a) First Embodiment

Figure 1A:
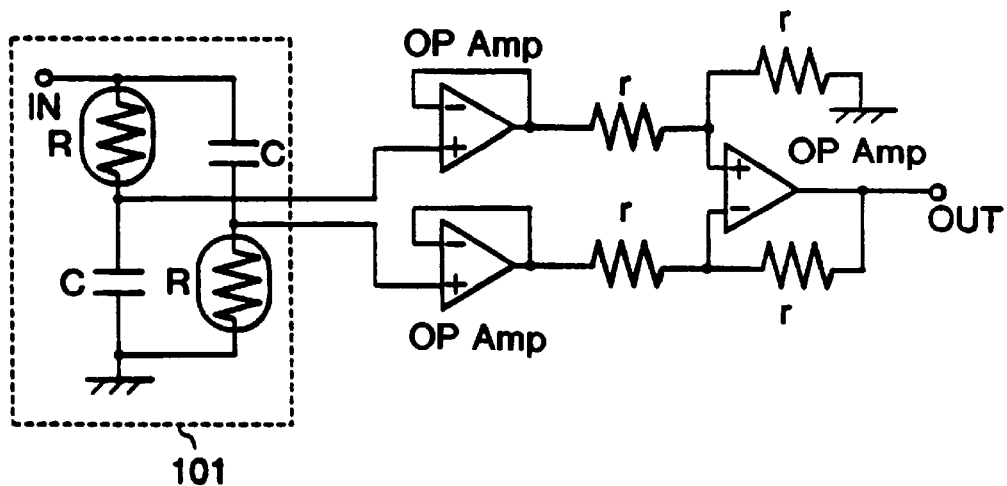
FIGS. 1A and 1B are explanatory views of a temperature phase shift circuit according to the first embodiment of the present invention.

FIG. 1A shows the arrangement of a temperature phase shift circuit as an embodiment of the present invention. A portion 101 surrounded by a broken line represents a phase shift unit for shifting the phase of a signal, and its operation is explained in FIG. 1B. The order of each of two sets of R-C (where R is a thermistor, and C is a capacitor) elements constituting a bridge circuit is reversed with respect to the other. The two sets of the R-C elements have substantially the same characteristics. Although the thermistor is used in this embodiment, any other temperature-sensing resistive element whose resistance changes with temperature may also be used. For example, a metal film resistive element with a selected coating also has temperature characteristics.

Since the output impedance of the phase shift unit in FIG. 1A largely varies in accordance with frequency, the right half portion of FIG. 1A constitutes an instrumentation amplifier, including operation amplifiers (OP Amps) and resistors (r) connected to each other as shown, having a large input impedance. However, a differential amplifier having a large impedance and the same gain may be constituted by a transistor or FET.

Figure 1B:
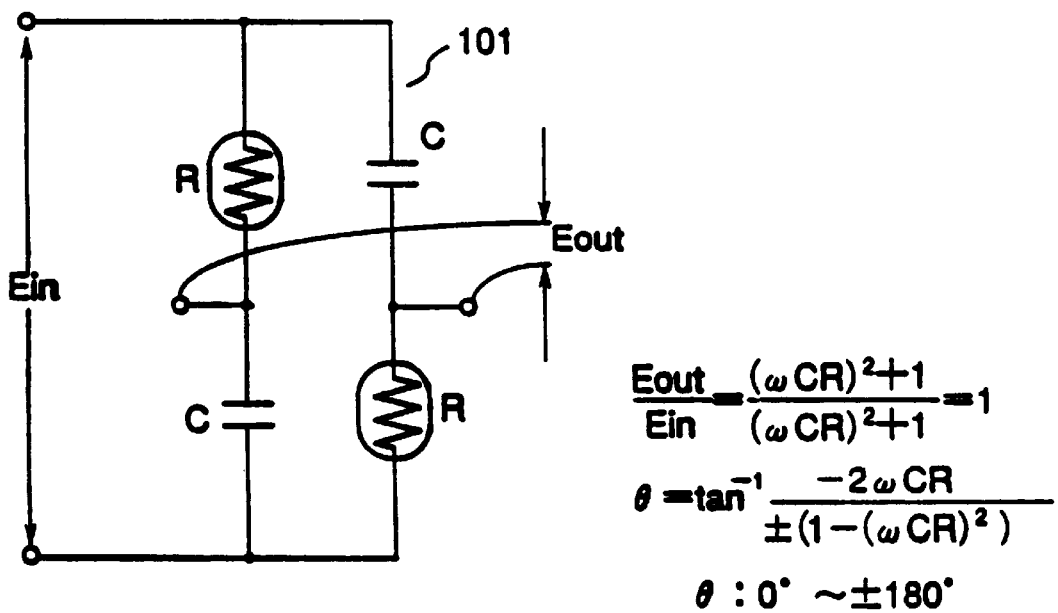

As shown in FIG. 1B, the input/output characteristics of the phase shift unit are represented by the following equation:

$$|Eout/Ein| = ((\omega CR)^2 + 1)/((\omega CR)^2 + 1) = 1 \quad (1)$$

$$\theta = \tan^{-1}[-2\omega CR/\pm\{1-(\omega CR)^2\}] \quad (2)$$

where $\theta$ represents the phase difference between Ein and Eout, and $\omega$ represents the angular frequency. When the frequency of Ein is f, $\omega = 2\pi f$. C and R respectively represent the electrical capacitance of the capacitor and the resistance of the thermistor. The ± signs of the denomination of equation (2) are reversed depending on the arrangement of the positive and negative terminals of the signal Eout. With the arrangement in FIG. 1A, the sign is +, and an output whose phase is advanced within a range of 0 to 180° from the in terminal is obtained at the out terminal.

As shown in equation (1), when the input voltage range of the right half portion of FIG. 1A, i.e., the differential amplifier portion is sufficiently large with respect to an input signal, a signal having the same amplitude without waveform variations can be obtained. As is apparent from equation (2), the output/input phase shift variation amount is uniquely determined by the value R when $\omega$ and C are constant.

A general example of the temperature vs. resistance characteristics of the thermistor will be described. Assuming that the reference temperature is defined as an intermediate temperature within the use environmental temperature range for the apparatus, and the resistance of the thermistor at the reference temperature is defined as R0, the resistance of the thermistor at a certain temperature can be represented by the following equation:

$$R0 = R0 \times \exp\{B \times (1/T - 1/T0)\} \quad (3)$$

where T and T0 respectively represent the use temperature value and the reference temperature as absolute temperatures, and B represents a constant value called a B constant which changes depending on each element and is as large as about several thousands. The B constant has a positive sign in an NTC thermistor, and a negative sign in a PTC thermistor. As is apparent from equation (3), the resistance of the thermistor decreases or increases exponentially with respect to temperature.

Figure 3:
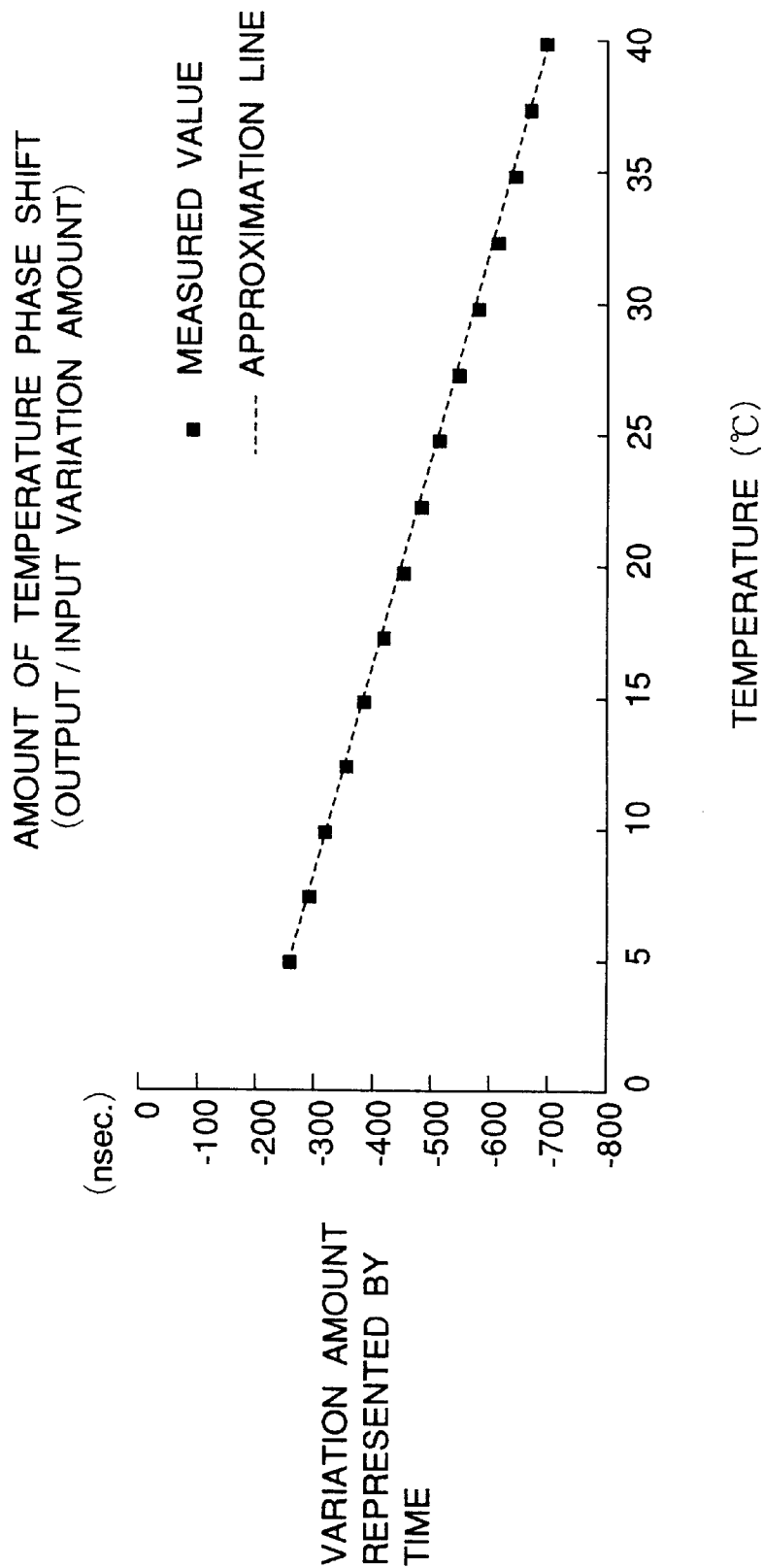
FIG. 3 is a graph showing the phase shift characteristics of the phase shift circuit.

FIG. 3 shows the measurement result of the characteristics of a phase shift circuit constituted using an NTC thermistor having a B constant of 3920 and a resistance of 2.5 kΩ at 25° C. A capacitor having a reference resistance (T=20° C.=293K)=3.13 kΩ within the circuit use environmental temperature range of 0 to 45° C. and having C=120 pF was used, the time constant determined by a set of R-C elements was τ=CR=375 nsec, and the cut-off frequency was fc=1/(2πτ)=424 kHz. The cut-off frequency was set to be substantially equal to an input signal frequency f=500 kHz. An output/input signal phase variation amount represented by a time is plotted along the ordinate of FIG. 3. Each square dot in FIG. 3 plots the actual measured value of the output/input variation amount represented by a time at each temperature. A broken line is a straight line obtained upon approximation of the actual measured values by a method of least square. As is apparent from FIG. 3, a phase shift circuit was realized in which the time, i.e., the phase linearly changes with respect to temperature.

Linear phase shift characteristics (represented by a time amount in FIG. 3) with respect to temperature are advantageous for the purpose of temperature compensation because many natural physical phenomena have temperature characteristics which can be approximated by an almost linear relationship. In addition, when this circuit is used as a basic circuit, application design is facilitated.

Figure 4:
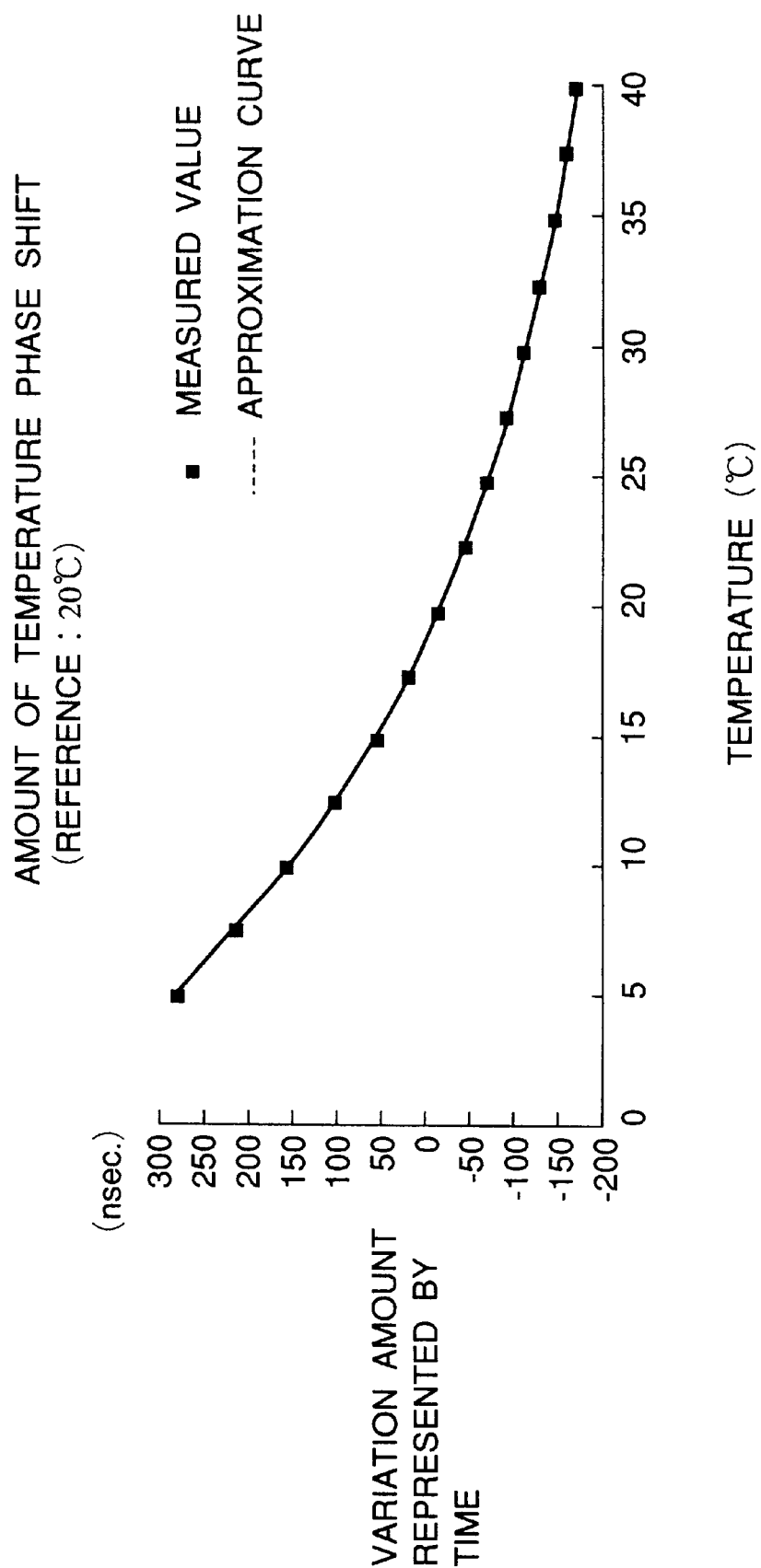
FIG. 4 is a graph showing the phase shift characteristics of the phase shift circuit, which characteristics are obtained upon shifting fc.

FIG. 4 is a chart showing characteristics obtained when a capacitor with an input signal frequency f=70 kHz and C=43 pF (fc=1481 kHz) was used, and f was largely shifted from fc. When f is shifted from fc, the linear relationship between the temperature and the phase shift amount is disturbed. As the shift amount becomes larger, the variation amount becomes smaller, and the gradient becomes slower (at high temperatures). Either characteristics in FIGS. 3 and 4 may be used in accordance with phase shift characteristics required by the phase shift circuit.

(b) Second Embodiment

Figure 5:
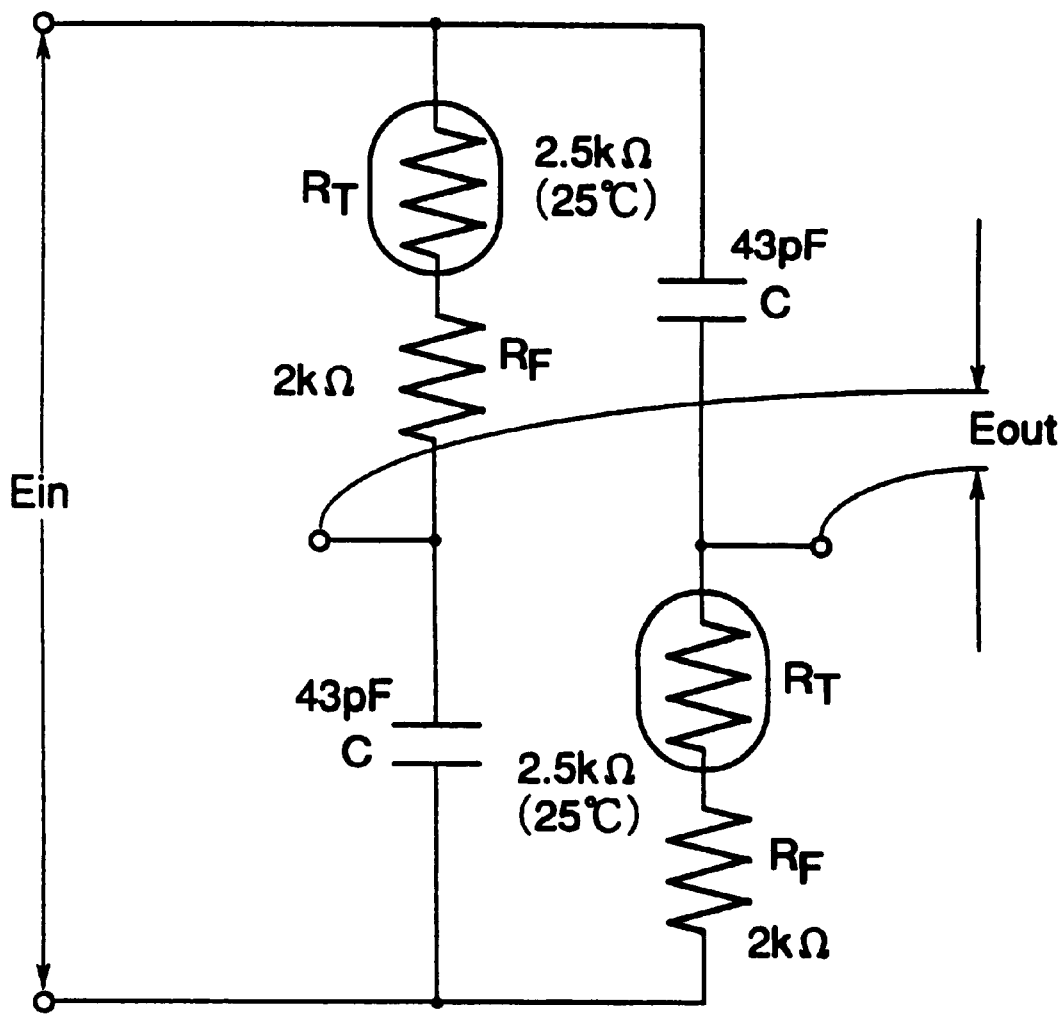
FIG. 5 is an explanatory view of the second embodiment according to the present invention.

FIG. 5 is a circuit diagram of a phase shift circuit having an arrangement different from that in FIG. 1A. A temperature-sensing resistive element paired with a capacitor is constituted by combining a thermistor $R_T$ (any other temperature-sensing resistive element may also be used) and a fixed resistive element $R_F$.

Figure 6:
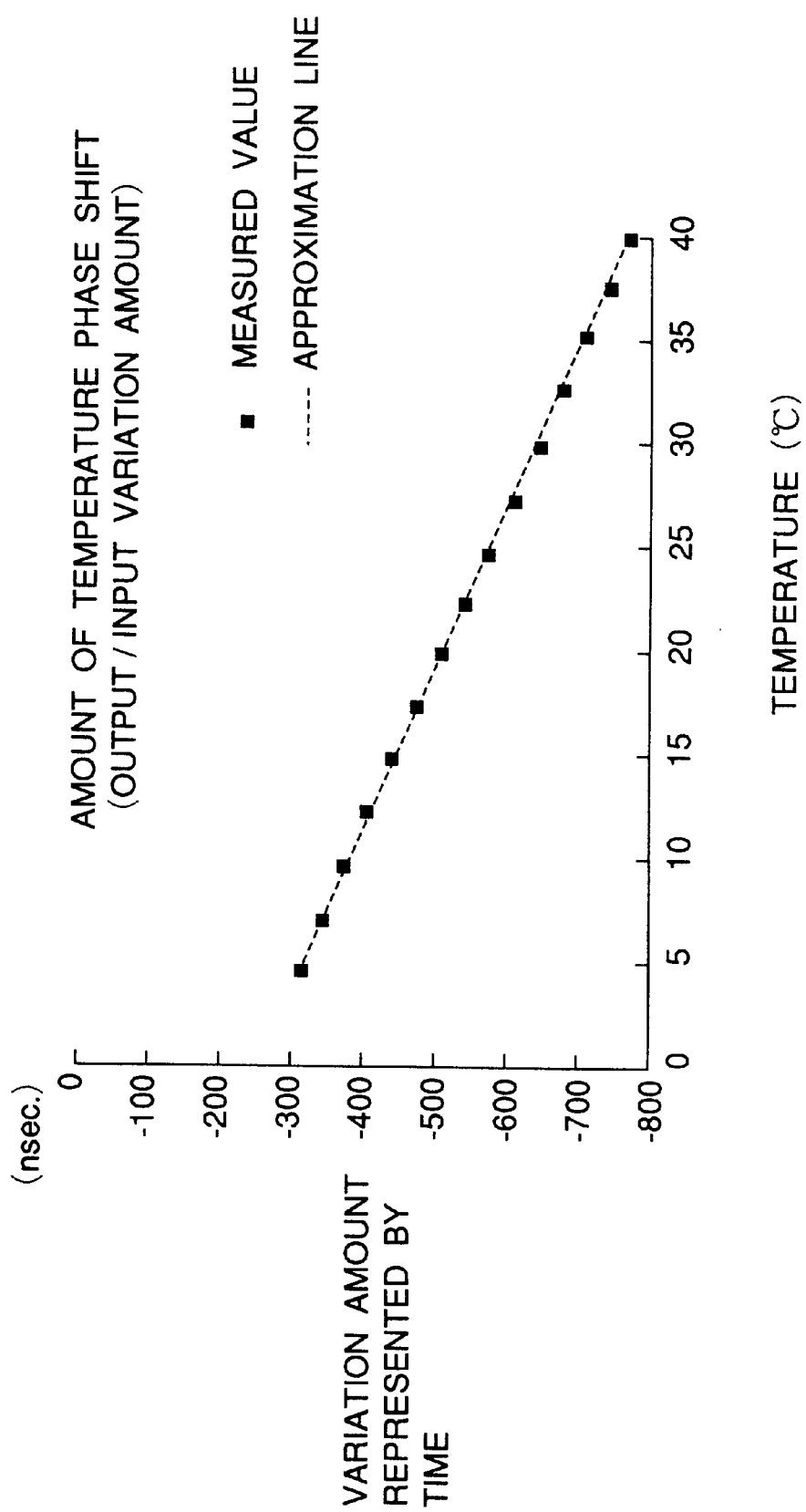
FIG. 6 is a graph showing the phase shift characteristics of a circuit in FIG. 5.

The B constant of a thermistor is as large as only several thousands. For this reason, when the desired phase shift, i.e., the time variation amount is too large or too small, or when the input signal frequency is excessively high or low, required characteristics cannot be obtained by a thermistor in the simple arrangement of FIG. 1A. In the phase shift circuit in FIG. 5, fc=6.1 kHz (T=20° C.). Output/input temperature phase shift characteristics obtained at an input signal frequency f=60 kHz are shown in FIG. 6. As is apparent from FIG. 6, when a fixed resistive element and a temperature-sensing resistive element are appropriately combined with each other, linear temperature vs. time variation amount characteristics can be similarly obtained using the same thermistor even at a different input signal frequency. However, these characteristics cannot be regarded as the same characteristics from the viewpoint of the phase shift amount because the input signal frequency is different. In this embodiment, the fixed resistive element is connected in series. However, it may also be connected in parallel, as a matter of course.

Figure 7:
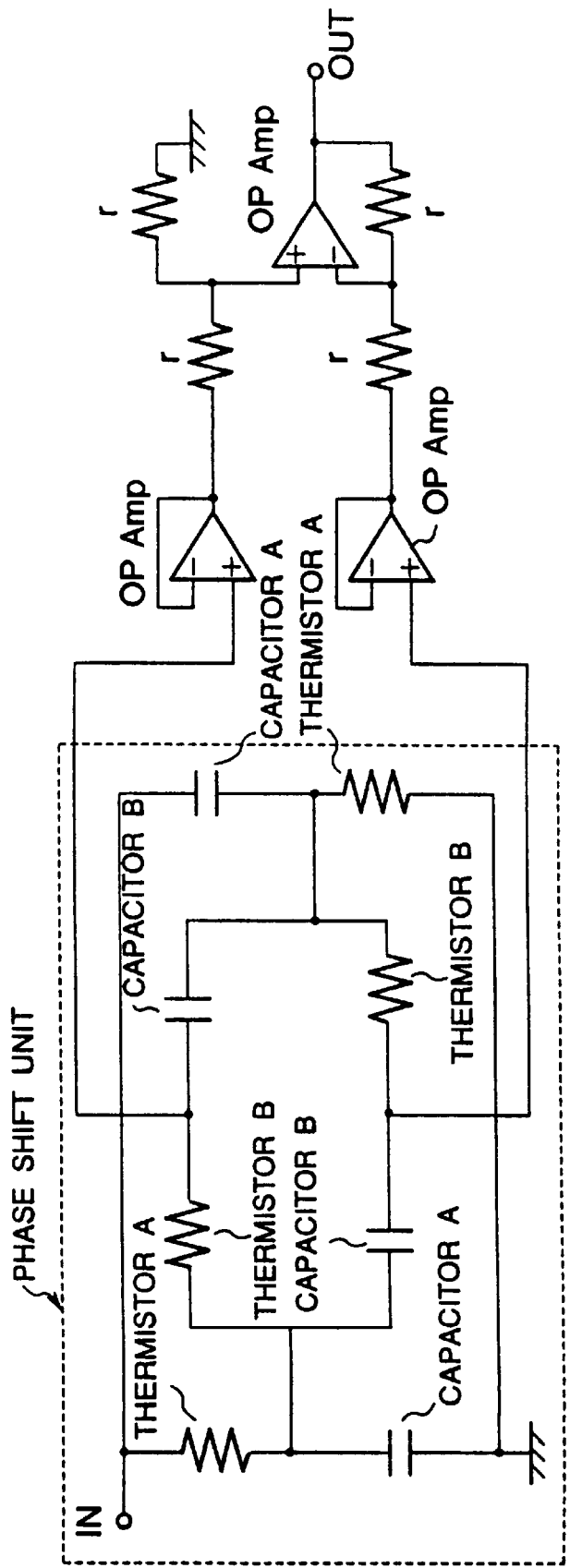
FIG. 7 is an explanatory view of the third embodiment according to the present invention.

FIG. 7 is a circuit diagram of another phase shift circuit. If a desired absolute phase shift variation amount cannot be sufficiently obtained, two stages of phase shift units in FIG. 1B are coupled with each other, as shown in FIG. 7, thereby doubling the phase shift amount. When n stages of phase shift units are coupled, an n time phase shift amount can be obtained. A desired variation amount can be obtained by combining phase shift units of a plurality of types having different phase shift amounts. Therefore, design is obviously facilitated.

As described above, the phase shift circuit of this embodiment can be made compact with a small number of elements. When elements are appropriately selected, or a number of stages of phase shift circuits are connected, a desired temperature phase shift amount can be freely designed, thereby widening the application range. In addition, the temperature vs. phase shift amount variation characteristics can be either linearly or non-linearly designed by properly selecting elements.

(c) Third Embodiment

Figure 2:
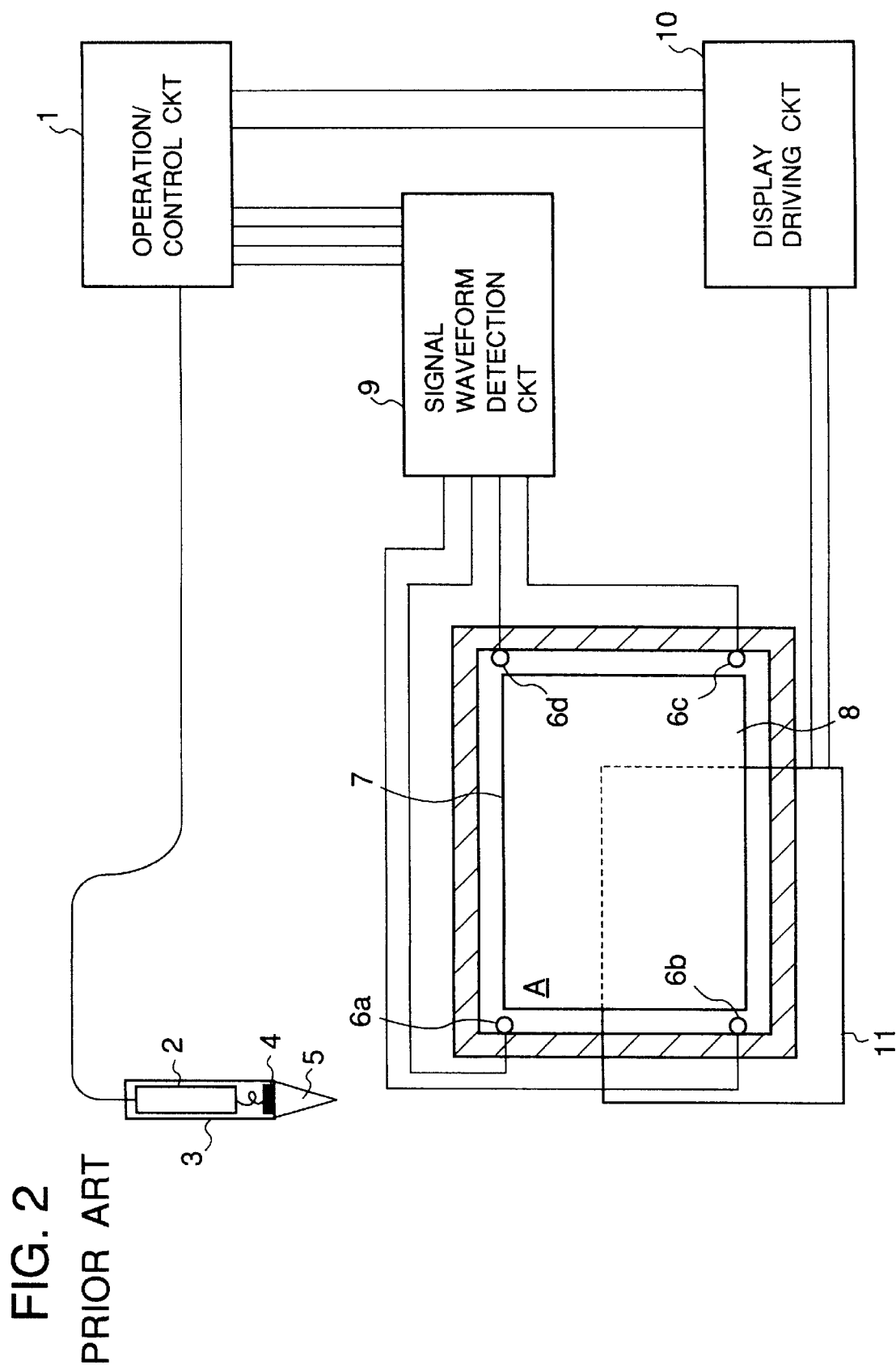
FIG. 2 is an explanatory view of a conventional coordinate input apparatus.
Figure 8:
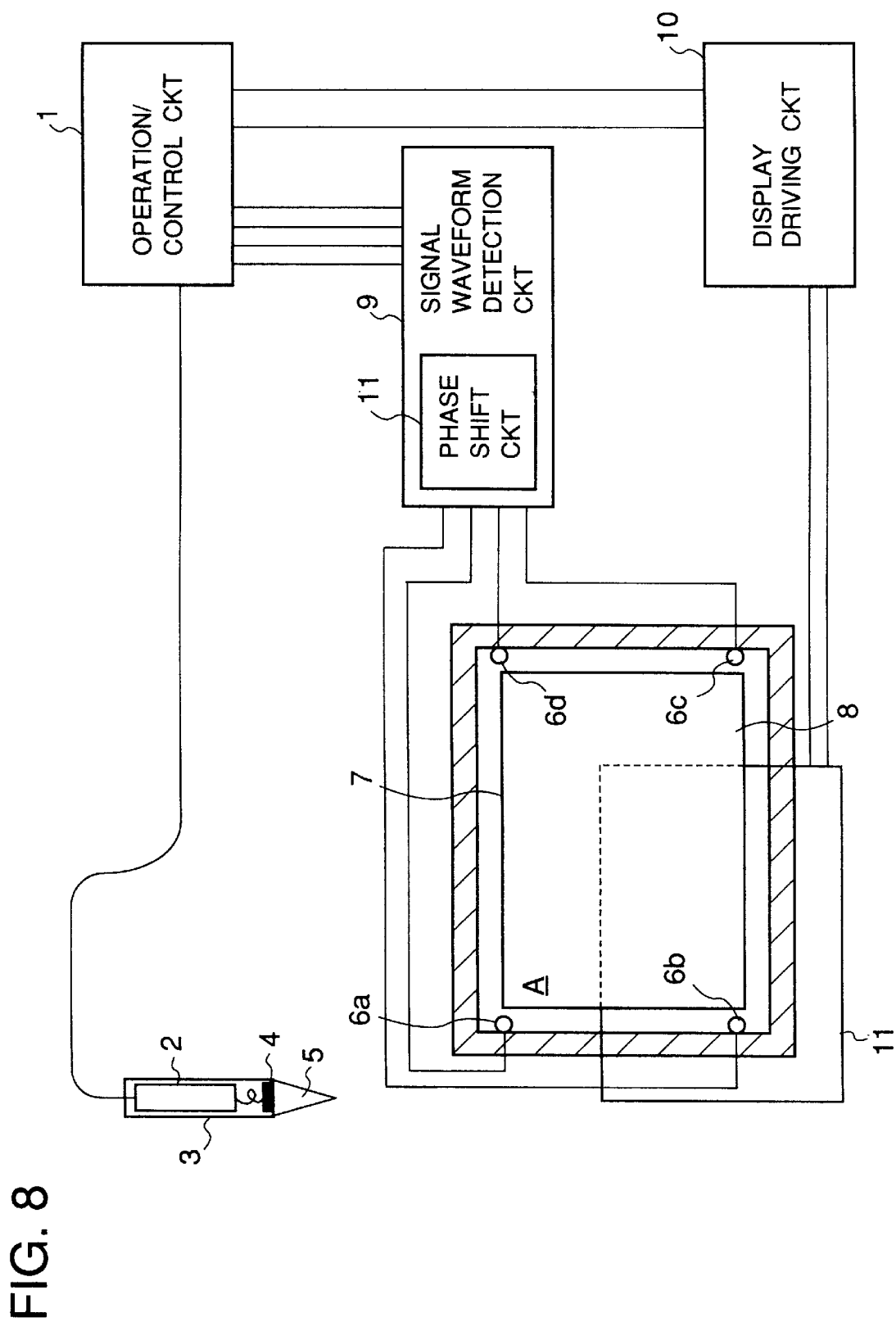
FIG. 8 is an explanatory view of a coordinate input apparatus according to the third embodiment.

A coordinate input apparatus using an ultrasonic wave will be described below with reference to FIG. 8. FIG. 8 is a block diagram showing an embodiment of an ultrasonic wave coordinate input apparatus according to the present invention. This apparatus is largely different from the prior art in FIG. 2 in that a phase shift circuit 11 is arranged in a signal waveform detection circuit 9.

Figure 9:
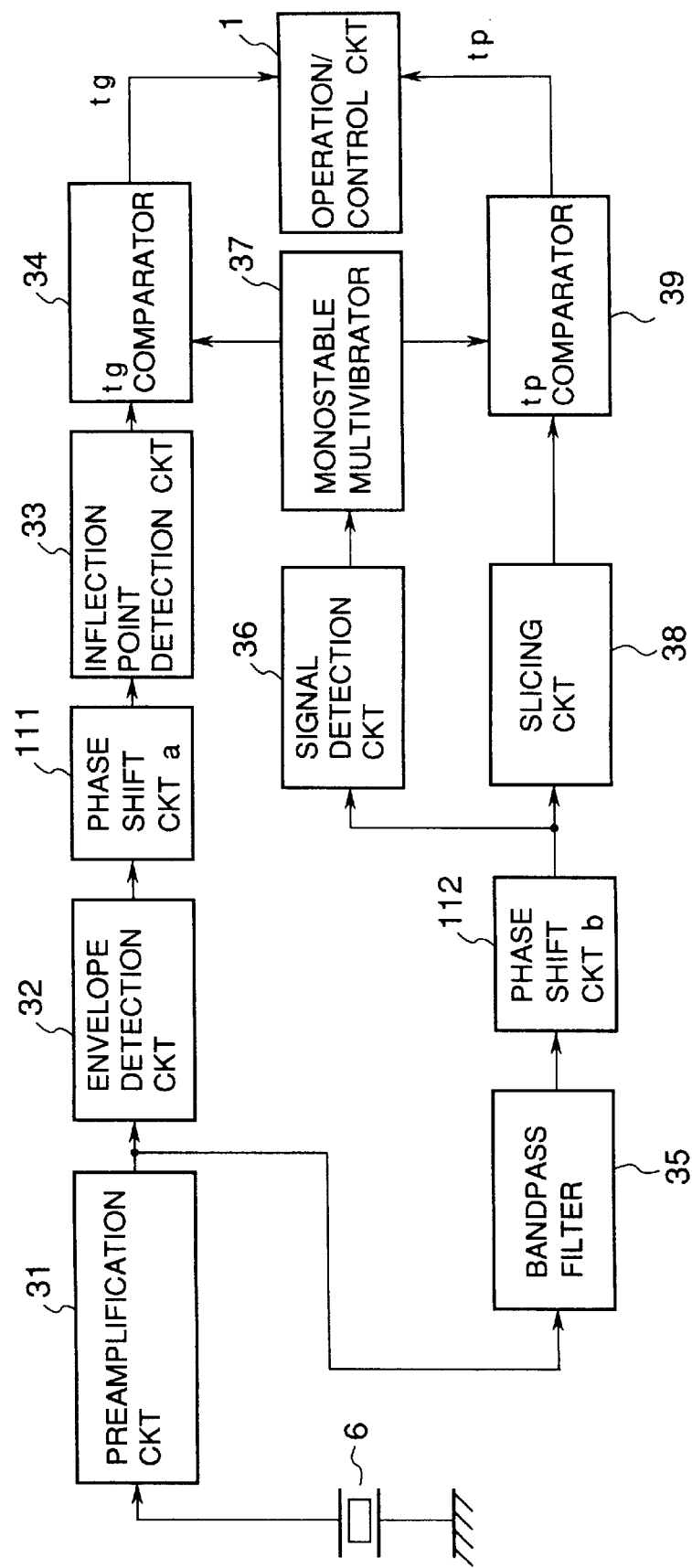
FIG. 9 is a block diagram showing the arrangement of a signal waveform detection circuit.

FIG. 9 is a block diagram showing the arrangement of the signal waveform detection circuit 9. This embodiment uses a principle in which Lamb wave propagating in a vibration transmission plate 8 is used to measure two vibration propagation times, i.e., the group delay arrival time and a phase delay arrival time of a vibration, thereby enabling highly precise coordinate calculation output.

FIGS. 10(a)–10(i) are perspective timing charts showing waveforms so as to explain the operation of the signal waveform detection circuit 9. The operation of the phase shift circuit is omitted in FIG. 10, which will be described later in detail. The operation of one vibration sensor, i.e., a vibration sensor 6a in FIG. 8 will be described below with reference to FIGS. 9 and 10. Remaining vibration sensors 6b to 6d also similarly operate.

Measurement of the vibration transmission time to the vibration sensor 6a is started simultaneously with supply of a driving signal to a vibration member driving circuit 2. At this time, a driving signal 41 is sent from an operation/control circuit 1. A vibration generated at a vibration pen 3 in accordance with the signal 41 propagates for a period of time corresponding to the distance to the vibration sensor 6a, and thereafter, is detected by the vibration sensor 6a. A signal obtained upon detection of the vibration by the vibration sensor 6a is amplified by a preamplification circuit 31, thereby obtaining a detection signal waveform 42. Since the vibration used in this embodiment is Lamb wave, the relative relationship between the envelope of the detected waveform and the phase changes in accordance with the propagation distance in the vibration transmission plate 8. For this reason, when a group delay time tg and a phase delay time tp are detected, the distance between the vibration pen 3 and the vibration sensor 6a can be precisely measured. Signals 47 and 49 for measuring the above-described two vibration transmission times tg and tp are finally output from the signal waveform detection circuit 9. These processes will be sequentially described below.

Referring to FIG. 9, only an envelope 421 is extracted from the detection signal 42 by an envelope detection circuit 32. Two-step differential processing of the envelope 421 is performed by an inflection point detection circuit 33 constituted by two stages of differential circuits, in which the positively-going inflection point of the envelope as an input signal is converted into the first negatively-going zero-crossing point of an output waveform, thereby outputting a two-step differential signal 43.

At the same time, extraneous frequency components are removed from the detection signal 42 by a bandpass filter 35, thereby obtaining a filter output signal 44.

A signal detection circuit 36 forms a pulse signal 45 corresponding to components higher than a threshold signal 441 (to be referred to as a comparative level hereinafter) having a predetermined level in the filter output signal 44. A monostable multivibrator 37 enables a gate signal 46 having a predetermined time width, which is triggered at the first leading edge of the pulse signal 45. The gate signal 46 serves as an operation switch of a tg comparator 34 and a tp comparator 39. The tg comparator 34 detects the first negatively-going zero-crossing point (corresponding to the positively-going inflection point of the envelope, as described above) of the two-step differential signal 43 during the enabled period of a gate signal 48, thereby supplying a group delay arrival time signal tg 49 to the operation/control circuit 1. The tp comparator 39 detects the first positively-going zero-crossing point (a negatively-going zero-crossing point may also be detected) of a signal (a description of the waveform will be omitted) obtained by slicing the filter signal 44 during the enabled period of the gate signal 46 by a slicing circuit 38, thereby supplying a phase delay arrival time signal tp 47 to the operation/control circuit 1.

As for the phase delay arrival time signal tp 47 in this embodiment, a time until the first leading edge is measured to reduce the influence of reflection. However, depending on the arrangement, a time until the second or later leading edge may also be measured. In addition, the slicing circuit 38 slices the waveform only to keep a predetermined input level range of the comparator and stabilize the output characteristics of the comparator.

Figure 11A:
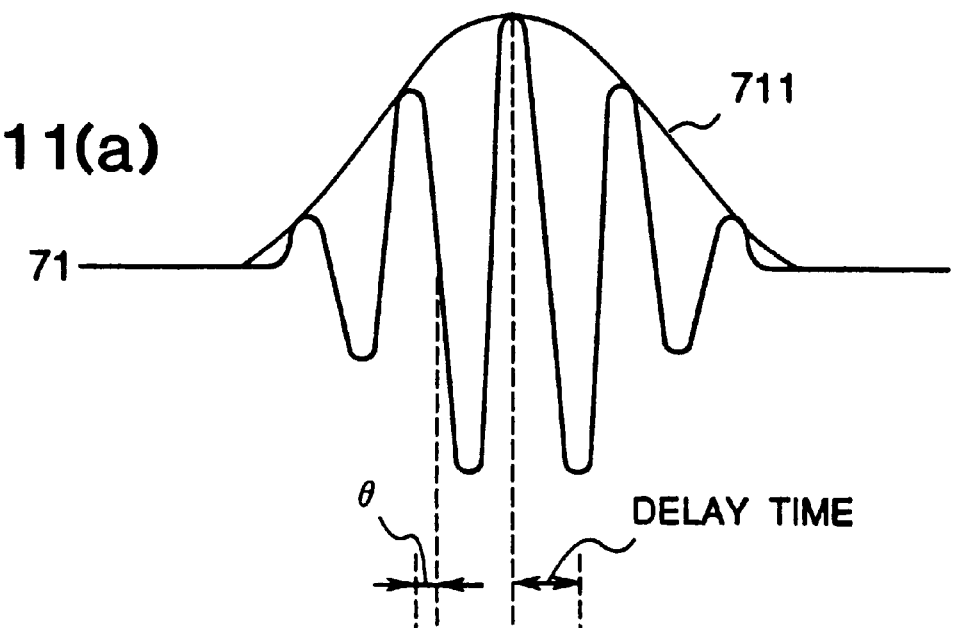
FIGS. 11(a) and 11(b) are explanatory views of a pulse waveform input operation of a phase shift circuit.
Figure 11B:
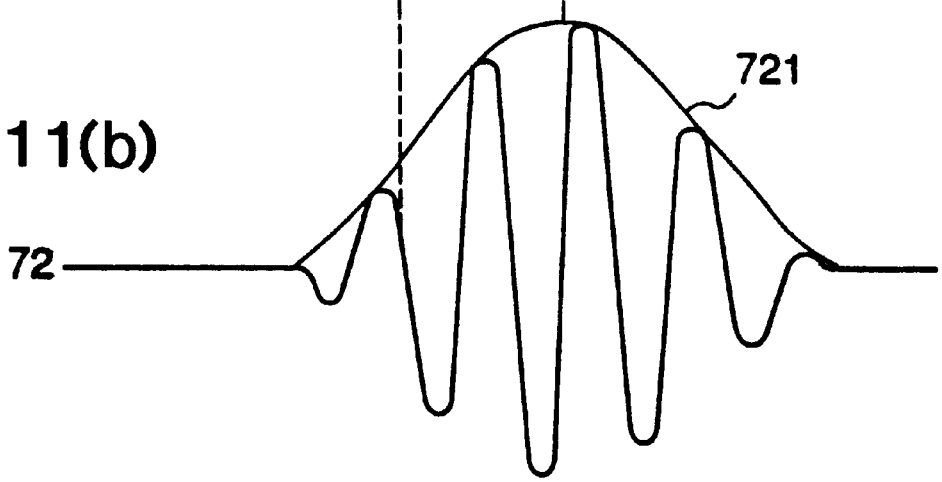

The operation of a phase shift circuit b 112 will be described below with reference to FIG. 11(a) and 11(b).

A filter output signal serving as an input signal is assumed to have a waveform 71 for the descriptive convenience. An output signal from the phase shift circuit b 112 has a waveform 72. The phase shift circuit exhibits interesting characteristics with respect to not a continuous signal but a pulse-like input signal such as the filter output signal 71. More specifically, as shown in FIG. 11, an output/input phase shift variation θ (indicated as an amount represented by a time in FIG. 11) changes in accordance with equation (2). However, the peak of an envelope 721 of the output signal 72 is delayed from that of an envelope 711 of the input signal 71 by only a circuit delay time amount indicated as a "delay time". Even when the characteristics of the phase shift circuit b 112 are changed (values C and R are changed) to vary the phase shift amount θ to be obtained, the circuit delay time amount scarcely changes.

Therefore, a phase shift circuit a 111 arranged for temperature compensation of the group delay arrival time tg in FIG. 9 must not be the same as the phase shift circuit b 112. With a central frequency component f of the envelope signal 421 as an input signal, equation (2) need be used to independently design the phase shift amount. In this case, the frequency component f is as low as almost $\frac{1}{10}$ that (vibration frequency) used to design the phase shift circuit b 112.

Figure 12A:
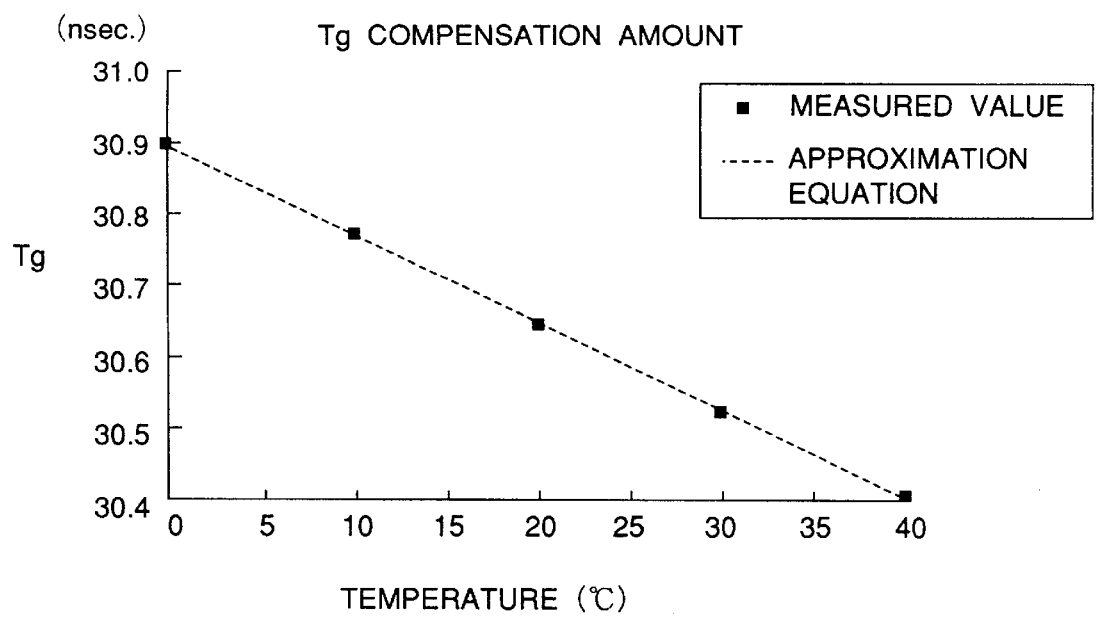
FIGS. 12A and 12B are graphs showing the phase shift characteristics of a phase shift means.
Figure 12B:
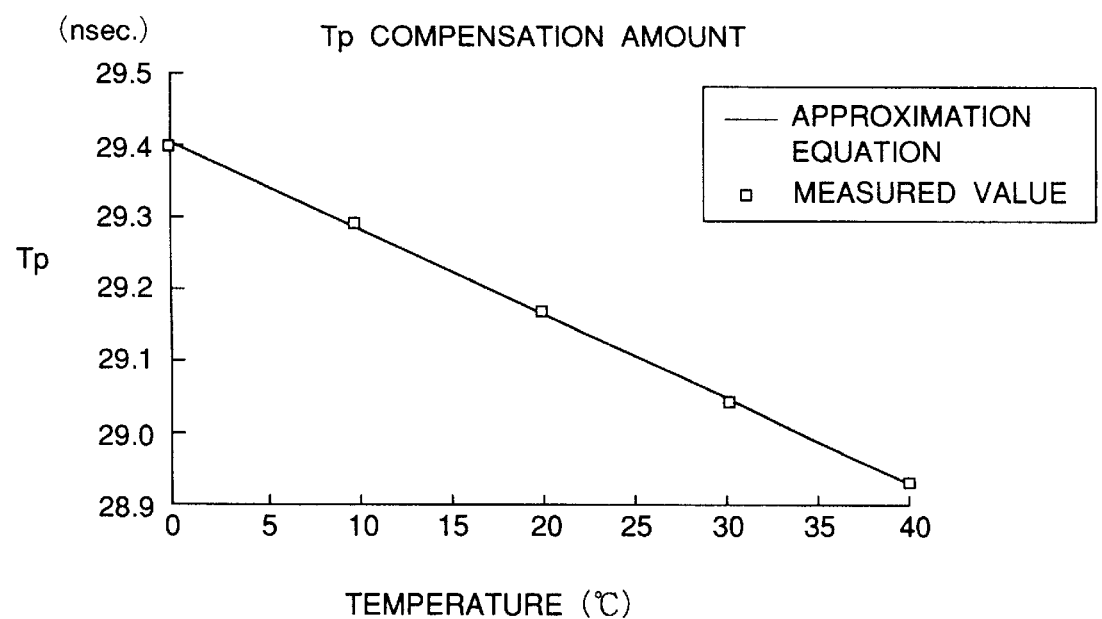

FIGS. 12A and 12B show the measurement results of the temperature characteristics of the circuit in. FIG. 9 with respect to the times tg and tp, respectively. As an input signal, a reference signal electrically stable with respect to temperature was used. A change in arrival timing due to a change in temperature, which has been described in the description of the prior art, is mainly attributed to a change in vibration propagation time in the pen. For this reason, as described above, almost the same time variation amount is generated for both the group delay time tg and the phase delay time tp, which amount linearly changes with respect to temperature. In the characteristics shown in FIGS. 12A and 12B, the delay time linearly changes with respect to temperature. Therefore, the characteristics are preferable to cancel any change in delay time with respect to a change in temperature in the coordinate input apparatus of this embodiment.

As described above, the coordinate input apparatus of this embodiment does not require a special operation by the user of the apparatus, and an extra sensor and a circuit accompanying the sensor are unnecessary. Highly precise correction matching the characteristics of the shift amount of the vibration arrival timing with respect to a change in temperature can be performed. In addition, highly precise coordinate input can be performed stably with respect to a change in temperature.

(d) Fourth Embodiment

FIG. 9 shows the coordinate input apparatus with a high precision using both the group delay time tg and the phase delay time tp. However, when a phase shift circuit is provided to a coordinate input apparatus with a low precision using only a group delay time tg, the same effect can be obtained.

Figure 13:
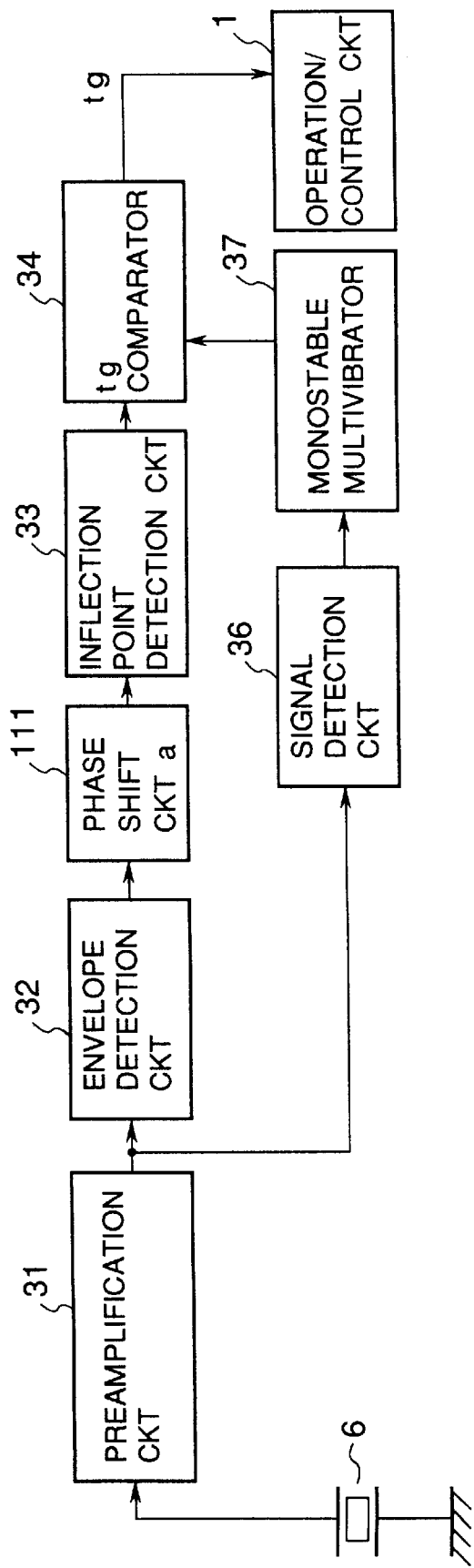
FIG. 13 is an explanatory view of the third embodiment according to the present invention.

FIG. 13 is a block diagram of a signal waveform detection circuit for measuring only the group delay time tg. The signal waveform detection circuit has an arrangement in which a detection signal 42 is used as an input signal for generating a gate signal 46 while eliminating the lower stage of FIG. 9. When the signal waveform detection circuit with this arrangement is used, the group delay time can be used to calculate a vibration input position. In this case, the shift of the group delay time with respect to a change in temperature can be corrected to perform coordinate input stable with respect to a change in temperature as well.

Figure 14:
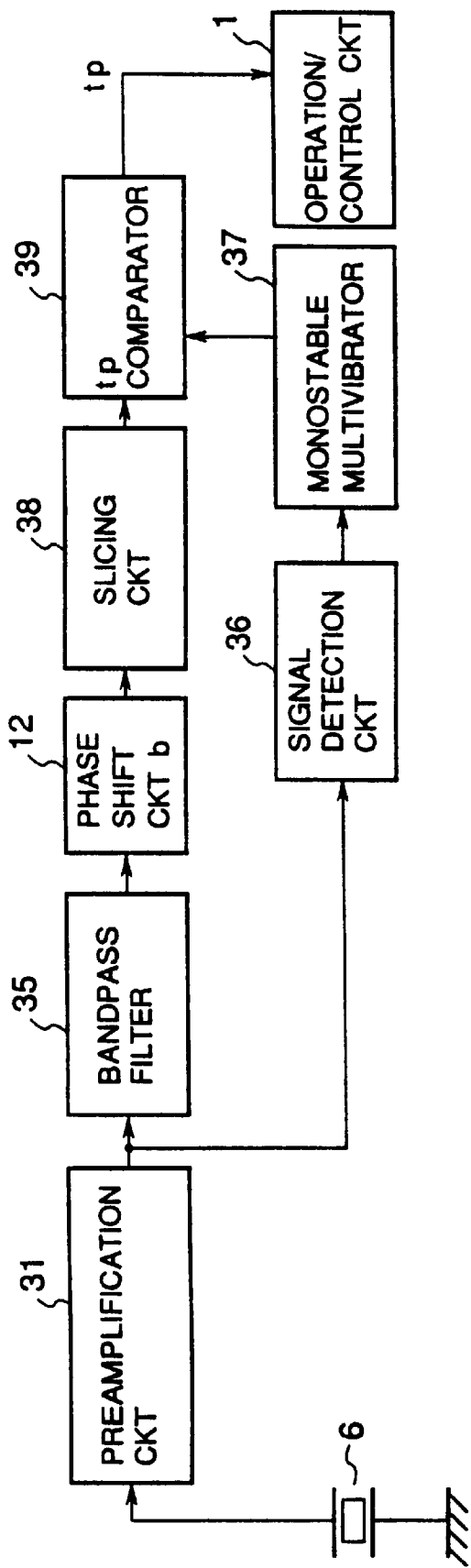
FIG. 14 is an explanatory view of the fourth embodiment according to the fourth embodiment.

This signal waveform detection circuit can also be applied to a coordinate input apparatus which uses Lamb wave (which limits the plate compression, the vibration frequency, and the vibration mode of a vibration transmission plate 8) having a small difference between the group velocity and the phase velocity to detect only the phase delay time, thereby performing coordinate calculation. FIG. 14 shows a signal waveform detection circuit for measuring only a phase delay time tp. This circuit has an arrangement obtained by eliminating the elements subsequent to the envelope detection circuit 32 of the upper stage in FIG. 9. When the signal waveform detection circuit with this arrangement is used, the phase delay time can be used to calculate the vibration input position. In this case, the shift of the phase delay time with respect to a change in temperature can be corrected to perform coordinate input stable with respect to a change in temperature as well.

As has been described above, a phase shift means is provided to generate a phase amount for canceling a change in a time offset amount, which is generated in the entire apparatus, even when the temperature changes. With this arrangement, temperature compensation is realized, and a stable and reliable coordinate input apparatus is realized.

The present invention may be applied to a system comprising a plurality of equipments or an apparatus comprising a single equipment. It is needless to say that the present invention can be applied to the case which can be attained by supplying programs to the system or the apparatus.

As has been described above, the temperature phase shift circuit according to the present invention can be made compact and freely design a desired temperature phase shift amount, resulting in a wide range of application.

The coordinate input apparatus according to the present invention can perform coordinate detection stable with respect to changes in temperature with a simple arrangement.

What is claimed is:

1. A signal waveform detection circuit for a coordinate input apparatus, said signal waveform detection circuit comprising:

detecting means for detecting, in a vibration transmission member of the coordinate input apparatus, a vibration input into the vibration transmission member at a particular coordinate location, and for outputting a signal in response to detecting the vibration;

an envelope waveform detection circuit for outputting an envelope waveform signal corresponding to the signal output by the detecting means;

a plurality of temperature phase shift circuits, wherein a first one of the temperature phase shift circuits outputs a pulsed wave output signal delayed with respect to the envelope waveform signal in accordance with an ambient temperature, a second one of the temperature phase shift circuits outputs another pulsed wave output signal that is delayed with respect to the signal output by the detecting means in accordance with the ambient temperature, and each of the first and second temperature phase shift circuits has a respective predetermined phase shift characteristic; and means for generating a group delay arrival time signal and a phase delay arrival time signal based on the pulsed wave output signals output by the first and second temperature phase shift circuits, respectively, and for outputting the group delay arrival time signal and the phase delay arrival time signal to a coordinate calculation circuit for calculating the particular coordinate location at which the vibration is input into the vibration transmission member, based on the group delay arrival time signal and the phase delay arrival time signal, and wherein at least one of the temperature phase shift circuits comprises:

a first bridge circuit, having four terminals (A, B, C and D), comprising:
at least a first and a second temperature-sensing resistive portion, a resistance of each of which changes with respect to a change in the ambient temperature; and
at least a first and a second capacitor,
wherein said first resistive portion is connected between the terminals A and B, said first capacitor is connected between the terminals B and C, said second resistive portion is connected between the terminals C and D, and said second capacitor is connected between the terminals D and A, and wherein an input signal of the at least one temperature phase shift circuit is formed across terminals A and C, and an output of the at least one temperature phase shift circuit is formed across terminals B and D.

2. A signal waveform detection circuit according to claim 1, wherein each temperature-sensing resistive portion comprises a thermistor whose resistance exponentially changes with respect to the change in ambient temperature, and the resistance of one of the temperature-sensing resistive portions at a reference temperature and a capacitance of one of the capacitors are selected such that a cut-off frequency determined by the reference resistance and the capacitance is substantially equal to the frequency of the input signal of the at least one temperature phase shift circuit.

3. A signal waveform detection circuit according to claim 1, wherein each temperature-sensing resistive portion has substantially the same resistance and each capacitance has substantially the same capacitance.

4. A signal waveform detection circuit according to claim 2, wherein each temperature-sensing resistive portion has substantially the same resistance and each capacitance has substantially the same capacitance.

5. A signal waveform detection circuit according to claim 1, wherein each temperature-sensing resistive portion comprises a temperature-sensing resistor having a resistance that exponentially changes with respect to the change in the ambient temperature, said temperature-sensing resistor being electrically connected to a resistor having a fixed resistance.

6. A signal waveform detection circuit according to claim 2, wherein each temperature-sensing resistive portion comprises a temperature-sensing resistor having a resistance that exponentially changes with respect to the change in the ambient temperature, said temperature-sensing resistor being electrically connected to a resistor having a fixed resistance.

7. A signal waveform detection circuit according to claim 3, wherein each temperature-sensing resistive portion comprises a temperature-sensing resistor having a resistance that exponentially changes with respect to the change in the ambient temperature, said temperature-sensing resistor being electrically connected to a resistor having a fixed resistance.

8. A signal waveform detection circuit according to claim 4, wherein each temperature-sensing resistive portion comprises a temperature-sensing resistor having a resistance that exponentially changes with respect to the change in the ambient temperature, said temperature-sensing resistor being electrically connected to a resistor having a fixed resistance.

9. A signal waveform detection circuit according to claim 1, wherein the at least one temperature phase shift circuit further comprises:

at least a second bridge circuit, having four terminals (A', B', C' and D'), comprising:
at least a third and a fourth temperature-sensing resistive portion, a resistance of each of which changes with respect to a change in the ambient temperature; and
at least a first and a second capacitor,
wherein said third resistive portion is connected between the terminals A' and B', said third capacitor is connected between the terminals B' and C', said fourth resistive portion is connected between the terminals C, and D', and said fourth capacitor is connected between the terminals D' and A', and wherein an input signal is input across terminals A' and C' and an output signal is output from across terminals B' and D', and wherein said first and second bridge circuits are interconnected so that an output signal of said first bridge circuit is the input signal input to said second bridge circuit.

10. A signal waveform detection circuit according to claim 2, wherein the at least one temperature phase shift circuit further comprises:

at least a second bridge circuit, having four terminals (A', B', C' and D'), comprising:
at least a third and a fourth temperature-sensing resistive portion, a resistance of each of which changes with respect to a change in the ambient temperature; and
at least a first and a second capacitor,
wherein said third resistive portion is connected between the terminals A' and B', said third capacitor is connected between the terminals B' and C', said fourth resistive portion is connected between the terminals C' and D', and said fourth capacitor is connected between the terminals D' and A', and wherein an input signal is input across terminals A' and C' and an output signal is output from across terminals B' and D', and wherein said first and second bridge circuits are interconnected so that an output signal of said first bridge circuit is the input signal input to said second bridge circuit.

11. A signal waveform detection circuit according to claim 3, wherein the at least one temperature phase shift circuit further comprises:

at least a second bridge circuit, having four terminals (A', B', C' and D'), comprising:

at least a third and a fourth temperature-sensing resistive portion, a resistance of each of which changes with respect to a change in the ambient temperature; and at least a first and a second capacitor, wherein said third resistive portion is connected between the terminals A' and B', said third capacitor is connected between the terminals B' and C', said fourth resistive portion is connected between the terminals C' and D', and said fourth capacitor is connected between the terminals D' and A', and wherein an input signal is input across terminals A' and C' and an output signal is output from across terminals B' and D', and wherein said first and second bridge circuits are interconnected so that an output signal of said first bridge circuit is the input signal input to said second bridge circuit.

12. A signal waveform detection circuit according to claim 4, wherein the at least one temperature phase shift circuit further comprises:

at least a second bridge circuit, having four terminals (A', B', C' and D'), comprising:

at least a third and a fourth temperature-sensing resistive portion, a resistance of each of which changes with respect to a change in the ambient temperature; and at least a first and a second capacitor, wherein said third resistive portion is connected between the terminals A' and B', said third capacitor is connected between the terminals B' and C', said fourth resistive portion is connected between the terminals C' and D', and said fourth capacitor is connected between the terminals D' and A', and wherein an input signal is input across terminals A' and C' and an output signal is output from across terminals B' and D', and wherein said first and second bridge circuits are interconnected so that an output signal of said first bridge circuit is the input signal input to said second bridge circuit.

13. A signal waveform detection circuit according to claim 5, wherein the at least one temperature phase shift circuit further comprises:

at least a second bridge circuit, having four terminals (A', B', C' and D'), comprising:

at least a third and a fourth temperature-sensing resistive portion, a resistance of each of which changes with respect to a change in the ambient temperature; and at least a first and a second capacitor, wherein said third resistive portion is connected between the terminals A' and B', said third capacitor is connected between the terminals B' and C', said fourth resistive portion is connected between the terminals C' and D', and said fourth capacitor is connected between the terminals D' and A', and wherein an input signal is input across terminals A' and C' and an output signal is output from across terminals B' and D', and wherein said first and second bridge circuits are interconnected so that an output signal of said first bridge circuit is the input signal input to said second bridge circuit.

14. A signal waveform detection circuit according to claim 6, wherein the at least one temperature phase shift circuit further comprises:

at least a second bridge circuit, having four terminals (A', B', C' and D'), comprising:

at least a third and a fourth temperature-sensing resistive portion, a resistance of each of which changes with respect to a change in the ambient temperature; and at least a first and a second capacitor, wherein said third resistive portion is connected between the terminals A' and B', said third capacitor is connected between the terminals B' and C', said fourth resistive portion is connected between the terminals C' and D', and said fourth capacitor is connected between the terminals D' and A', and wherein an input signal is input across terminals A' and C' and an output signal is output from across terminals B' and D', and wherein said first and second bridge circuits are interconnected so that an output signal of said first bridge circuit is the input signal input to said second bridge circuit.

15. A signal waveform detection circuit according to claim 7, wherein the at least one temperature phase shift circuit further comprises:

at least a second bridge circuit, having four terminals (A', B', C' and D'), comprising:

at least a third and a fourth temperature-sensing resistive portion, a resistance of each of which changes with respect to a change in the ambient temperature; and at least a first and a second capacitor, wherein said third resistive portion is connected between the terminals A' and B', said third capacitor is connected between the terminals B' and C', said fourth resistive portion is connected between the terminals C' and D', and said fourth capacitor is connected between the terminals D' and A', and wherein an input signal is input across terminals A' and C' and an output signal is output from across terminals B' and D', and wherein said first and second bridge circuits are interconnected so that an output signal of said first bridge circuit is the input signal input to said second bridge circuit.

16. A signal waveform detection circuit according to claim 8, wherein the at least one temperature phase shift circuit further comprises:

at least a second bridge circuit, having four terminals (A', B', C' and D'), comprising:

at least a third and a fourth temperature-sensing resistive portion, a resistance of each of which changes with respect to a change in the ambient temperature; and at least a first and a second capacitor, wherein said third resistive portion is connected between the terminals A' and B', said third capacitor is connected between the terminals B' and C', said fourth resistive portion is connected between the terminals C' and D', and said fourth capacitor is connected between the terminals D' and A' , and wherein an input signal is input across terminals A' and C' and an output signal is output from across terminals B' and D', and wherein said first and second bridge circuits are interconnected so that an output signal of said first bridge circuit is the input signal input to said second bridge circuit.

* * * * *

UNITED STATES PATENT AND TRADEMARK OFFICE
CERTIFICATE OF CORRECTION

PATENT NO. : 5,990,720
DATED : November 26, 1999
INVENTOR(S) : MASAKI TOKIOKA ET AL.

Page 1 of 3

It is certified that error appears in the above-identified patent and that said Letters Patent is hereby corrected as shown below:

ON THE TITLE PAGE:

[56] References Cited,
under FOREIGN PATENT DOCUMENTS:

"3185319" should read --3-185319--; and
"5080920" should read --5-080920--; and under *Attorney, Agent, or Firm*:

"Fitzpatrick Cella Harper & Scinto" should read --Fitzpatrick, Cella, Harper & Scinto--.

[57] ABSTRACT:

Line 17, "stable" should read --stability--.

COLUMN 2:

Line 45, "enhance" should read --to enhance--.

COLUMN 3:

Line 19, "use" should read --use or--.

COLUMN 4:

Line 30, "stable" should read --that is stable--.

UNITED STATES PATENT AND TRADEMARK OFFICE
CERTIFICATE OF CORRECTION

PATENT NO.    : 5,990,720
DATED         : November 26, 1999
INVENTOR(S)   : MASAKI TOKIOKA ET AL.

It is certified that error appears in the above-identified patent and that said Letters Patent is hereby corrected as shown below:

COLUMN 6:

Line 65, "square." should read --squares.--.

COLUMN 9:

Line 17, "FIG." should read --FIGS.--;
　　　Line 23, "FIG. 11," should read --FIGS. 11(a) and 11(b),--; and
　　　Line 25, "FIG. 11)" should read --FIGS. 11(a) and 11(b))--.

COLUMN 10:

Line 16, "stable" should read --that is stable--;
　　　Line 32, "stable" should read --that is stable--;
　　　Line 47, "design" should read --designable to--; and
　　　Line 50, "stable" should read --that is stable--.

UNITED STATES PATENT AND TRADEMARK OFFICE
CERTIFICATE OF CORRECTION

PATENT NO.    : 5,990,720
DATED         : November 26, 1999
INVENTOR(S)   : MASAKI TOKIOKA ET AL.

It is certified that error appears in the above-identified patent and that said Letters Patent is hereby corrected as shown below:

COLUMN 11:

Line 35, "signal" should be deleted; and
Line 48, "of the" should read --of an--.

Signed and Sealed this

Twenty-seventh Day of March, 2001

Attest:

NICHOLAS P. GODICI

Attesting Officer

Acting Director of the United States Patent and Trademark Office